June 6, 1939.  J. RAFFERTY ET AL  2,160,986
ANIMAL TRAP
Filed Dec. 2, 1937
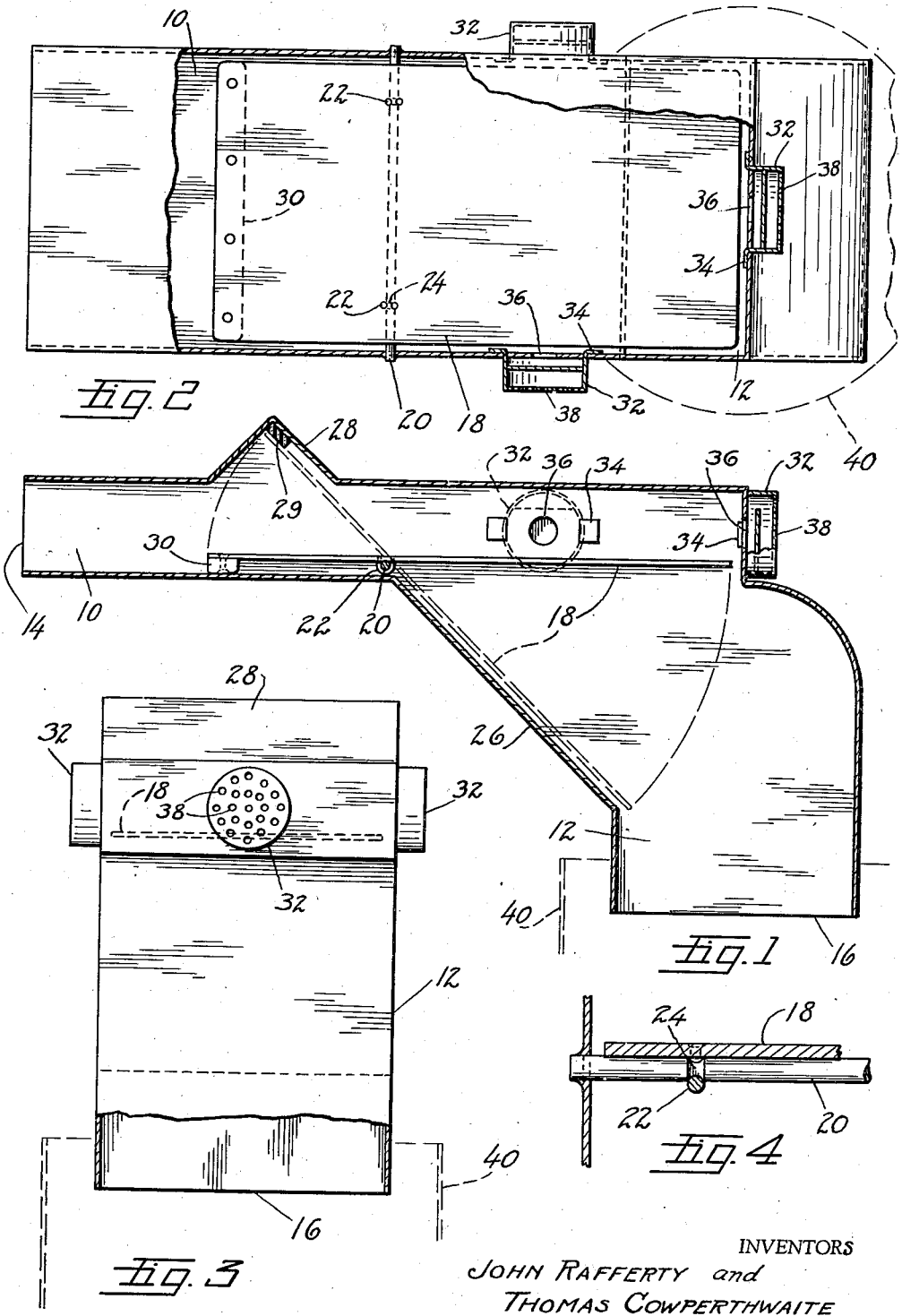
INVENTORS
JOHN RAFFERTY and
THOMAS COWPERTHWAITE
BY Parker & Burton  ATTORNEYS Patented June 6, 1939

2,160,986

UNITED STATES PATENT OFFICE 2,160,986

ANIMAL TRAP

John Rafferty and Thomas Cowperthwaite, Detroit, Mich.

Application December 2, 1937, Serial No. 177,766

4 Claims. (Cl. 43—69)

This invention relates to traps for animals and particularly to a rat trapping device which is continuously operable to entice and entrap rats at all times.

An important object of this invention is to provide a rat trapping device which is easy and economical to manufacture, and which is so constructed that its operation is assured at all times. More particularly, the invention comprehends a trapping device composed preferably of sheet metal sections arranged to form a novel L-shaped enclosure, one section of which extends horizontally to provide an entranceway to the device, and the other section of which extends vertically downward from one end of the former section to provide a discharge passage or chute through which the entrapped rats are dumped. The formation of the device is such that it is capable of being partially lowered into the ground so that the horizontal section thereof extends along the top of the ground. A trap door is provided in the enclosure and the sheet metal sections of the device are arranged in a novel way to provide sufficient clearance for the movement of the trap door. To allow for this movement, the sheet metal top section of the horizontal passage is preferably deformed into an inverted V-shaped projecting housing which allows the forward end of the trap door to swing above the level of the entranceway.

Various other objects, advantages and meritorious features of this invention will become more apparent from the following specification, appended claims, and the accompanying drawing, wherein:

Figure 1 is a side cross-sectional view of the device showing the trap door and the construction of the device for permitting a swinging movement of the trap door, Fig. 2 is a top view of the device partially broken away to show the interior, Fig. 3 is a rear end view of the device showing one of the bait receptacles, Fig. 4 is a detailed view showing the manner of pivotally supporting the trap door in the device.

Referring in detail to the drawing, the device has a general L-shaped formation as shown in Figure 1. The side, top and bottom sections, are preferably constructed of sheet metal folded upon itself to form a hollow L-shaped enclosure having a horizontal passageway 10 and a vertical passageway or chute 12 opening at its top end into one end of the horizontal passageway. The enclosure is entirely sealed except for the two ends of its L-shaped formation. The opened end 14 of the horizontal section remote from the juncture of the two passageways forms an entrance for rats or other types of animals for which this device may be used. The opened end 16 of the vertical passageway, remote from the juncture of the two passageways, forms a discharge opening through which animals entrapped by this device are dumped.

The swinging member or trap door 18, preferably formed of sheet metal, is provided in the device to suddenly dump an animal advancing thereover into the vertical passageway 12 and at the same time to close off the horizontal passageway against the return of such animal. The trap door is hinged at a point in the horizontal section of the device substantially midway between the opposite ends thereof. The hinge is preferably a pintle or pivot pin 20 extending across the horizontal passageway adjacent to the floor thereof and having its opposite ends fixed in the side walls thereof. U-shaped bolts 22 are provided at spaced intervals along the pivot pin to supportingly pivot the trap door to the top side of the pintle as shown in Figures 2 and 4. The pintle 20 is preferably provided with circumferential recesses 24 into which the U-shaped bolts may be seated as shown in Fig. 4 to prevent lateral movement of the trap door.

The section 26 of the floor of the horizontal passageway between the pivot pin 20 and the vertical passageway 12 is inclined downwardly at a relatively steep pitch as shown. The ceiling of the horizontal passageway at a point forwardly of the pintle is deformed into an inverted V-shaped housing 28 extending transversely across the width of the device. The rear wall section of this housing preferably extends in a plane substantially in alignment with the plane of the inclined floor section 26. The inverted V-shaped housing cooperates with the inclined floor section 26 to provide sufficient clearance so that the trap door 18 may be swung to a relatively steep pitch in the device. The maximum inclination of the trap door is indicated in dotted lines in Figure 1. Provided adjacent the top of the front of the housing 28 is a strip of sponge rubber 29 against which the forward end of the trap door strikes when it is tripped. The rubber strip deadens the noise of the trap door action and at the same time its resiliency assists in returning the trap door to normal horizontal position. The sudden stoppage of the trap door when it abuts both of these sections will jar the animal thereon and assist in causing it to lose its foothold on the inclined trap door. In addition, the rear inclined section of the housing 28 supports the rubber strip 29 so that the trap door has a flat surface against which it strikes thus eliminating the danger of the trap door becoming wedged in the interior of the device and becoming stuck in an inclined position.

The forward end of the trap door is preferably provided with a weight 30 which causes the trap door to normally assume a horizontal position substantially flush with the bottom of the entrance passageway. In this condition, the opposite end of the floor section terminates close to the bait and gives the impression that the floor of the horizontal passageway extends completely up to any one of the bait containers attached to the device.

Receptacles for containing rat bait are shown at 32. Two such receptacles are mounted on opposite sides of the horizontal passageway above the downwardly inclined section 26. A third container for bait is attached to the closed rear end of the horizontal passageway. These containers are attached as shown to the outside of the device so that they are readily accessible for supplying bait thereto. These containers have metal tabs 34 which extend through slots in the walls of the device and are bent over against the inside wall surfaces as shown in Figures 1 and 2. The wall sections of the device opposite each bait container are apertured as shown at 36 in Figs. 1 and 2. This allows the odor of the bait to permeate the interior of the device particularly adjacent the juncture of the two passageways and thus entice rats and other undesirable animals upon the yielding portion of the trap door. The outer walls of these bait container pockets may be perforated as shown in Fig. 3 to facilitate air circulation and odor distribution.

The operation of the device is readily apparent. An animal entering the entrance 14 is enticed upon the unsupported end of the trap door 18 which gives way until the forward end thereof abuts the strip of sponge rubber 29. The resulting jar as well as the steep pitch of the trap door causes the animal to be dumped into the passageway 12 and thence through discharge opening 16. The vertical passageway 12 may be supported in any suitable way over an enclosure or barrel indicated in dotted outline at 40. Various methods may be used in this barrel for exterminating the rats thus trapped. The device may be used outdoors as previously described or may, if desired, be built into the structure of a building with the horizontal entranceway flush with the floor. In large buildings a plurality of these devices might be used on the several floors and chutes might be provided for conducting the trapped rats to a common tank in the bottom of the building where they may be killed by poisonous gases.

What we claim:

1. An animal trap comprising, in combination, an enclosure of general L-shaped construction having a horizontally extending entrance passageway along one section of the L-shaped construction and a vertically extending discharge passageway along the other section of the construction opening at its top end into the horizontal passageway, said horizontal passageway having a height not substantially greater than the height of an average rat, a trap door member hinged intermediate its length near to the bottom of the enclosure adjacent to the junction of the two passageways having one end superimposing the floor of the horizontal passageway and the other end overhanging the vertical passageway, said member arranged to swing in an arc from a substantially horizontal position substantially on a level with the floor of the horizontal passageway to an inclined position closing the horizontal passageway and opening downwardly into the vertical passageway so that an animal advancing over the member causes the member to swing to its downwardly inclined position after the major portion of the weight of the animal has passed the hinge, the top of the horizontal passageway forwardly of the hinge provided with an angular upwardly projecting portion adapted to receive that end portion of the trap door which is forwardly of its hinge when such door is swung to an inclined position.

2. A rat trap comprising, in combination, a box-like enclosure having a substantially horizontal passageway of approximately the height of rats forming an entrance to the trap and a vertical passageway opening at the upper end into the horizontal passageway, a member in the enclosure pivoted about a horizontal axis adjacent to the floor of the horizontal passageway, the section of the floor of the enclosure from the pivotal connection of the member sloping downwardly to the vertical passageway, the top of the horizontal passageway forwardly of the pivotal connection of said member being upwardly and forwardly inclined in substantially the same plane as the downwardly inclined section of the floor whereby when the trap door is tripped by a rat the sections thereof on opposite sides of its pivotal connection to the enclosure simultaneously abut the inclined top and floor sections of the enclosure and impart a jar to the trap door member which aids in impelling the rat down the vertical passageway.

3. A rat trap comprising, in combination, an enclosure of a general L-shaped formation having a horizontally extending passageway forming one section of the L-shaped enclosure and a vertical passageway opening at its top end into the horizontal passageway adjacent one end of the latter and forming the other section of the L-shaped enclosure, the end of said horizontal passageway remote from the juncture of said passageway being open to form an entrance to the trap, the end of said vertical passageway remote from the juncture of said passageways being open to discharge rats thus trapped into any suitable form of exterminator, a trap door in the enclosure, means hinging the trap door adjacent to the floor of the horizontal passageway about a horizontal axis spaced from the vertical passageway, the floor of the horizontal passageway being inclined downwardly from the pivotal connection of the trap door to the vertical passageway, the top of said horizontal passageway being shaped at a point forwardly of the pivotal connecting means in the form of an inverted V with the rear end thereof projecting in a plane substantially in alignment with the downwardly inclined floor section, the inverted V section and the downwardly inclined floor section providing clearance so that when the trap door is tripped by a rat the trap door may swing until the parts on opposite sides of the trap door hinge simultaneously abut the inclined sections of the top and floor respectively, at which point the inclination of the trap door is sufficient to cause the rat to be discharged into the vertical passageway, weight means on the forward end of said trap door to return the trap door after it has been tripped to a position substantially flush with the floor of the horizontal passageway, and means adjacent the juncture of said passageways for containing bait to entice rats upon the trap door.

4. A rat trap composed of sheet metal arranged in a general L-shaped formation with one section thereof forming a horizontal passage of a height substantially that of the larger rats and the other section thereof forming a vertical passage opening at its top end into one end of the horizontal passage, the end of the horizontal passage remote from the juncture of said passages being open to form an entranceway for rats, the end of the vertical passage remote from the juncture of the passages likewise being open to form a discharge opening through which the trapped rats fall, a trap door formed of sheet metal in the enclosure having a width substantially equal to the width of the horizontal passage, a pintle extending horizontally across the floor of the horizontal passage spaced from the juncture of said passages, means pivotally securing the trap door to the pintle, the floor of the horizontal passage between the pintle and the vertical passage sloping downward at an inclination sufficient to prevent a rat from returning, the sheet metal forming the ceiling of the horizontal passage being deformed forwardly of the pintle and crosswise to the passage into an inverted V-shaped housing, the rear side section of said inverted V-shaped housing extending in substantially the plane of said downwardly inclined floor section so that clearance is provided on opposite sides of the pintle sufficient to allow the trap door to be swung to an inclined position in the plane of said inclined sections, and a container for rat bait secured to the outside of the enclosure adjacent to the juncture of said passages, the wall of the enclosure being perforated opposite said container so that the odor of the bait will permeate the passages of the enclosure and entice rats through the entrance thereto.

JOHN RAFFERTY.
THOMAS COWPERTHWAITE.